United States Patent
Barnett

(10) Patent No.: US 7,306,252 B2
(45) Date of Patent: Dec. 11, 2007

(54) HYDRAULIC DRIVE ARRANGEMENT FOR THE CUTTER OF A PULL-TYPE CROP HARVESTING MACHINE

(75) Inventor: Neil Gordon Barnett, Winnipeg (CA)

(73) Assignee: MacDon Industries Ltd., Winnipeg, Manitoba (CA)

( * ) Notice: Subject to any disclaimer, the term of this patent is extended or adjusted under 35 U.S.C. 154(b) by 147 days.

(21) Appl. No.: 11/362,535

(22) Filed: Feb. 27, 2006

(65) Prior Publication Data

US 2007/0199293 A1 Aug. 30, 2007

(51) Int. Cl.
*B60D 1/62* (2006.01)
*B60R 16/00* (2006.01)

(52) U.S. Cl. .................. 280/421; 172/449; 56/218

(58) Field of Classification Search ............. 172/449, 172/680, 776, 677, 679; 280/421, 400, 420; 56/218, 11.8, DIG. 14, DIG. 11
See application file for complete search history.

(56) References Cited

U.S. PATENT DOCUMENTS

| | | | | |
|---|---|---|---|---|
| 4,838,358 A | * | 6/1989 | Freudendahl | 172/125 |
| 5,099,937 A | * | 3/1992 | McLean | 180/53.3 |
| 5,152,357 A | * | 10/1992 | McLean et al. | 180/53.3 |
| 5,186,271 A | * | 2/1993 | McLean | 180/14.4 |
| 5,531,283 A | * | 7/1996 | Austin et al. | 180/53.1 |
| 5,706,901 A | * | 1/1998 | Walters et al. | 172/439 |
| 6,625,964 B2 | | 9/2003 | McLeod et al. | |
| 7,055,618 B2 | * | 6/2006 | Ehrhart et al. | 172/449 |

* cited by examiner

*Primary Examiner*—Árpád Fábián Kovács
(74) *Attorney, Agent, or Firm*—Adrian D. Battison; Michael R. Williams; Ryan W. Dupuis

(57) ABSTRACT

A pull-type crop harvesting machine has disk cutter carried on a frame mounted on ground wheels with a hitch arm extending from the frame over the header to a hitch connector of a tractor. The hitch arm is mounted for pivotal movement about a generally upright axis such that in a first position the tractor tows the frame in echelon to one side and in a second position the tractor tows the frame in echelon. The disks are hydraulically driven by a pump at the front end of the hitch arm and a motor at the frame with the hydraulic circuit including a sump tank defined by a hollow interior of the hitch arm and a cooling radiator defined by a tubular frame member which is preferably located at the disk drive as a support therefore as it is cooled by the air flow from the disks and contact with the crop and carries a low volume of fluid.

13 Claims, 4 Drawing Sheets

HYDRAULIC DRIVE ARRANGEMENT FOR THE CUTTER OF A PULL-TYPE CROP HARVESTING MACHINE

This invention relates to a pull-type crop harvesting machine of the type including a header carried on a frame to be towed behind a tractor and particularly to an improvement relating to the hydraulic drive to the cutter system.

Pull-type harvesting machines are towed from the tractor by a hitch arm which requires to be adjusted in angle relative to the frame of the machine for fine steering movements and more coarse movement to the transport position.

Some machines are required to follow the tractor only to one side and thus include a hitch arm which is located at one end of the machine. In others in which the present invention is particularly effective, the hitch arm to the tractor extends from the frame over the header to a hitch coupling and can be swung by an operating cylinder from one side of the header to the other so that the header can be located in echelon with the tractor to one side of symmetrically to the other side.

Pull-type harvesting machines of this type are well known and there are many different examples manufactured by a number of different companies.

The pull-type harvesting machines are mechanically driven in that there is a coupling which attaches the hitch arm to the tractor together with a mechanical linkage which connects to the power take off shaft of the tractor to communicate the driving power from the PTO shaft to the mechanically driven elements of the header.

Disc headers which utilize as the cutting system a plurality of spaced discs across the width of the header with each disc rotating about a respective vertical axis are known and widely used. In view of the relatively high power consumption of disc headers, it is desirable to communicate the drive hydraulically. Thus a pump is provided adjacent the forward end of the hitch arm which attaches to the power take off shaft of the tractor. The pump generates a flow of high pressure hydraulic fluid which passes through a hydraulic hose line from the pump along the hitch arm to a motor at the cutter system. A return line runs from the motor back to a filter and from the filter into a sump tank which is commonly provided as the hollow interior of the tubular hitch arm.

A simple construction provides a simple mechanical connection of the forward end of the hitch arm to the draw bar of the tractor so that the hitch arm is directly attached to the draw bar of the tractor so that the hitch arm is directly attached to the draw bar. In a simple construction commonly the pump is simply a separate item which attaches to the PTO shaft and is supported thereby. This arrangement is adequate for lower powered systems where the weight of the pump is relatively low so that it avoids applying significant loading to the PTO shaft which could cause damage.

However in higher power systems, it is desirable that the pump is mounted on the hitch construction so that it is properly supported from the draw bar with little or no loads being transferred to the PTO shaft.

One example of an arrangement of this type is shown in U.S. Pat. No. 4,838,358 (Freudendahl) issued Jun. 13$^{th}$ 1989. This discloses an arrangement of this type which attaches the forward end of the hitch arm to a tractor either to a draw bar or to the lower arms of the three point hitch and also attaches the pump to the tractor in a manner which supports the pump from the draw bar or the hitch rather than from the PTO shaft.

This arrangement has however a number of disadvantages in that different designs are provided for the draw bar construction and for the three point hitch construction and of course it is highly desirable that a common design is provided. Furthermore the arrangement locates the pump at a forward position which reduces the length of the connecting shaft which can be connected between the pump and the PTO shaft which thus reduces maneuverability.

In addition this arrangement provides no attention to the requirement for cooling of the hydraulic system, particularly when high power transfer is required since high power of course generates a high level of heat in the pump and the motor.

Another arrangement is disclosed in U.S. Pat. No. 6,625,964 (McLeod) issued Sep. 30, 2003. This construction provides a complex device for towing equipment in a row one behind the-other which has achieved no commercial success.

SUMMARY OF THE INVENTION

It is one object of the invention to provide an improved machine of the above type.

According to one aspect of the invention there is provided a pull-type crop harvesting machine for towed movement by a tractor comprising:

a frame mounted on ground wheels for movement across ground carrying a standing crop for harvesting;

a cutter system mounted across a front of the frame so that the frame carries the cutter system into the standing crop for cutting the standing crop and converging the cut crop into a crop discharge;

a hitch arm extending from the frame to a forward end of the hitch arm arranged for attachment to a hitch connector of a tractor by which the frame and the cutter system are towed across the ground;

a connecting assembly for connecting the forward end of the hitch arm to a hitch connector of the tractor;

a hydraulic circuit for providing drive to the machine comprising:

a hydraulic pump for generating a flow of hydraulic fluid under pressure;

a hydraulic motor for driving the cutter system;

hydraulic connection lines for communicating the flow from the pump to the motor and from the motor back to the pump;

and a mechanical drive connection for connecting the pump to a PTO shaft of the tractor;

the frame including a transverse frame member extending across the frame at the rear of the hitch arm;

the transverse frame member having ground wheels attached thereto for supporting the frame in movement across the ground;

the frame including a transverse cutter support bar extending across the frame at the cutting system for supporting the cutting system;

at least one of the transverse frame member and the transverse cutter support bar being formed from a tubular structural member which is closed at or adjacent each end so as to form a hollow conduit and having a fluid connection at each end for connection to the hydraulic connection lines such that hydraulic fluid in the hydraulic circuit passes through said at least one so as to effect cooling of the hydraulic fluid.

In one preferred arrangement the transverse frame member is formed from a tubular structural member which is closed at or adjacent each end so as to form a hollow conduit and having a fluid connection at each end for connection to the hydraulic connection lines such that hydraulic fluid in the hydraulic circuit passes through said at least one so as to effect cooling of the hydraulic fluid.

Preferably there is provided a sump tank and a filter in the hydraulic circuit.

In a preferred arrangement, the hydraulic drive is arranged to drive the cutter system. However the same cooling system can be used for an accessory on the machine such as a crop feeding device where the cooling system is used either for the accessory alone or for both the main drive and the accessory drive.

According to a second aspect of the invention there is provided a pull-type crop harvesting machine for towed movement by a tractor comprising:

a frame mounted, on ground wheels for movement across ground carrying a standing crop for harvesting;

a cutter system mounted across a front of the frame so that the frame carries the cutter system into the standing crop for cutting the standing crop and converging the cut crop into a crop discharge;

a hitch arm extending from the frame to a forward end of the hitch arm arranged for attachment to a hitch connector of a tractor by which the frame and the cutter system are towed across the ground;

a connecting assembly for connecting the forward end of the hitch arm to a hitch connector of the tractor;

a hydraulic circuit for providing drive to the machine comprising:

a hydraulic pump for generating a flow of hydraulic fluid under pressure;

a hydraulic motor for driving the cutter system;

hydraulic connection lines for communicating the flow from the pump to the motor and from the motor back to the pump;

and a mechanical drive connection for connecting the pump to a PTO shaft of the tractor;

the frame including a transverse frame member extending across the frame at the rear of the hitch arm;

the transverse frame member having ground wheels attached thereto for supporting the frame in movement across the ground;

the frame including a transverse cutter support bar extending across the frame at the cutting system for supporting the cutting system;

the transverse cutter support bar being formed from a tubular structural member which is closed at or adjacent each end so as to form a hollow conduit and having a fluid connection at each end for connection to the hydraulic connection lines such that hydraulic fluid in the hydraulic circuit passes through said transverse cutter support bar so as to effect cooling of the hydraulic fluid.

Preferably the sump tank is defined by the hitch arm which is formed from a tubular structural member which is closed at or adjacent each end so as to form a hollow conduit and having a fluid connection at each end for connection to the hydraulic connection lines such that hydraulic fluid in the hydraulic circuit passes through said at least one so as to effect cooling of the hydraulic fluid.

Preferably the transverse cutter support bar is cooled by contact with an air stream generated by the cutter system.

Preferably the transverse cutter support bar is cooled by contact with crop as the bar passes over the ground.

Preferably the transverse cutter support bar contains less than 5 gallons of the hydraulic fluid.

Preferably the cutter system comprises an elongate drive member and a plurality of rotating disks mounted on the drive member at spaced positions across the width of the header.

Preferably the transverse cutter support bar is located behind the rotating disks.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
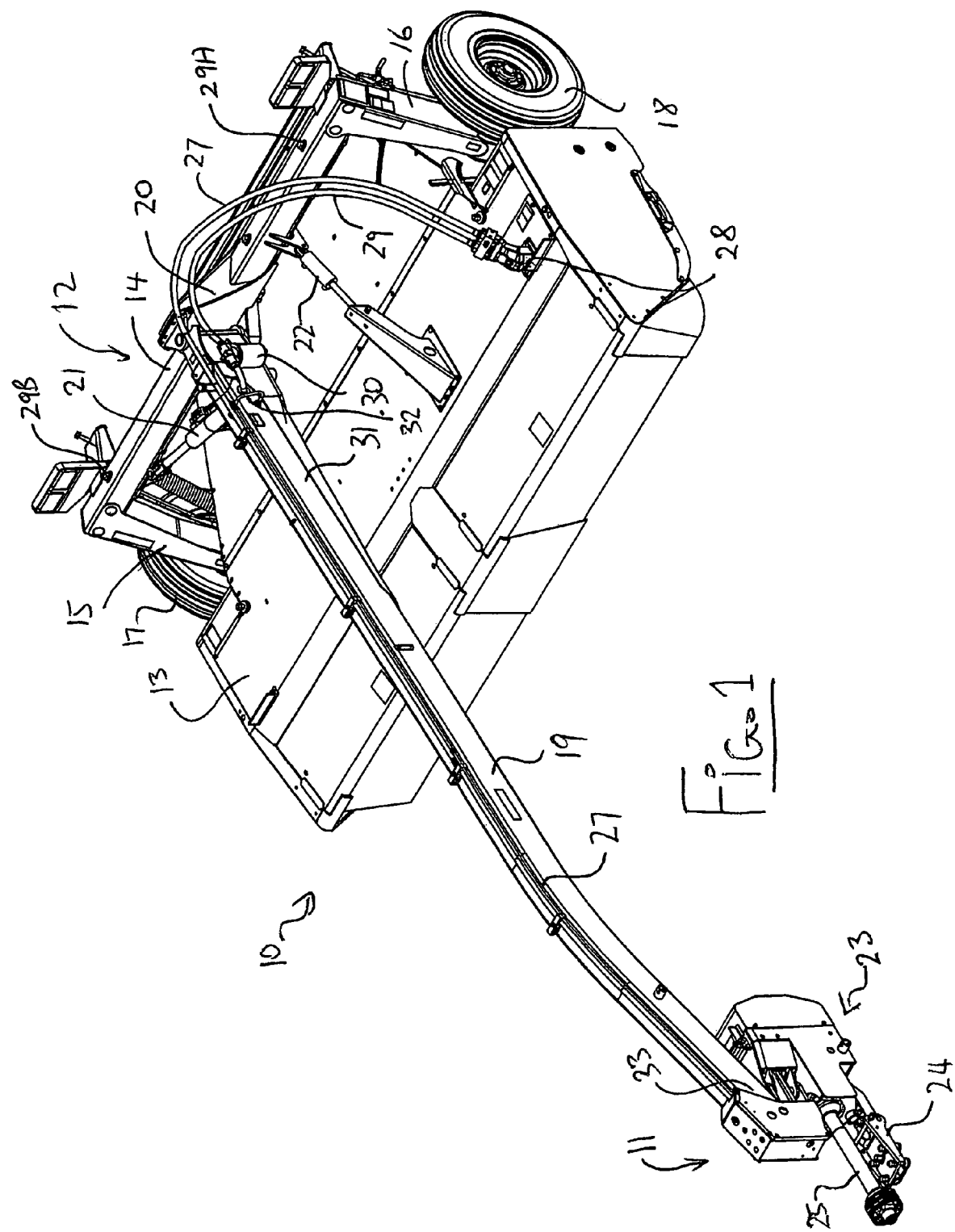
FIG. 1 is an isometric view of a pull-type crop harvesting machine according to the present invention for attachment to a tractor, with the tractor omitted for convenience of illustration.
Figure 2:
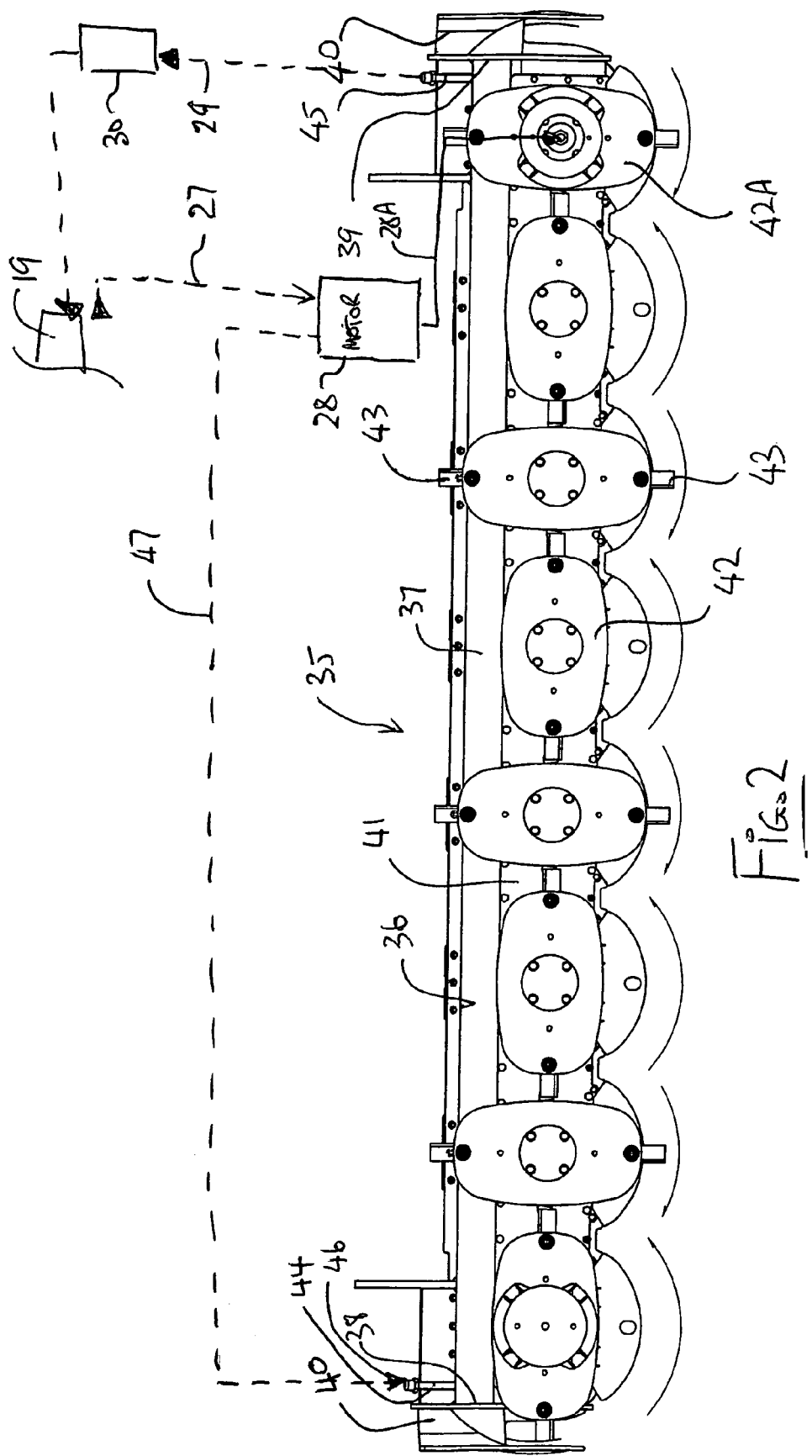
FIG. 2 is a top plan view of the cutter bar assembly of the harvesting machine of FIG. 1.
Figure 3:
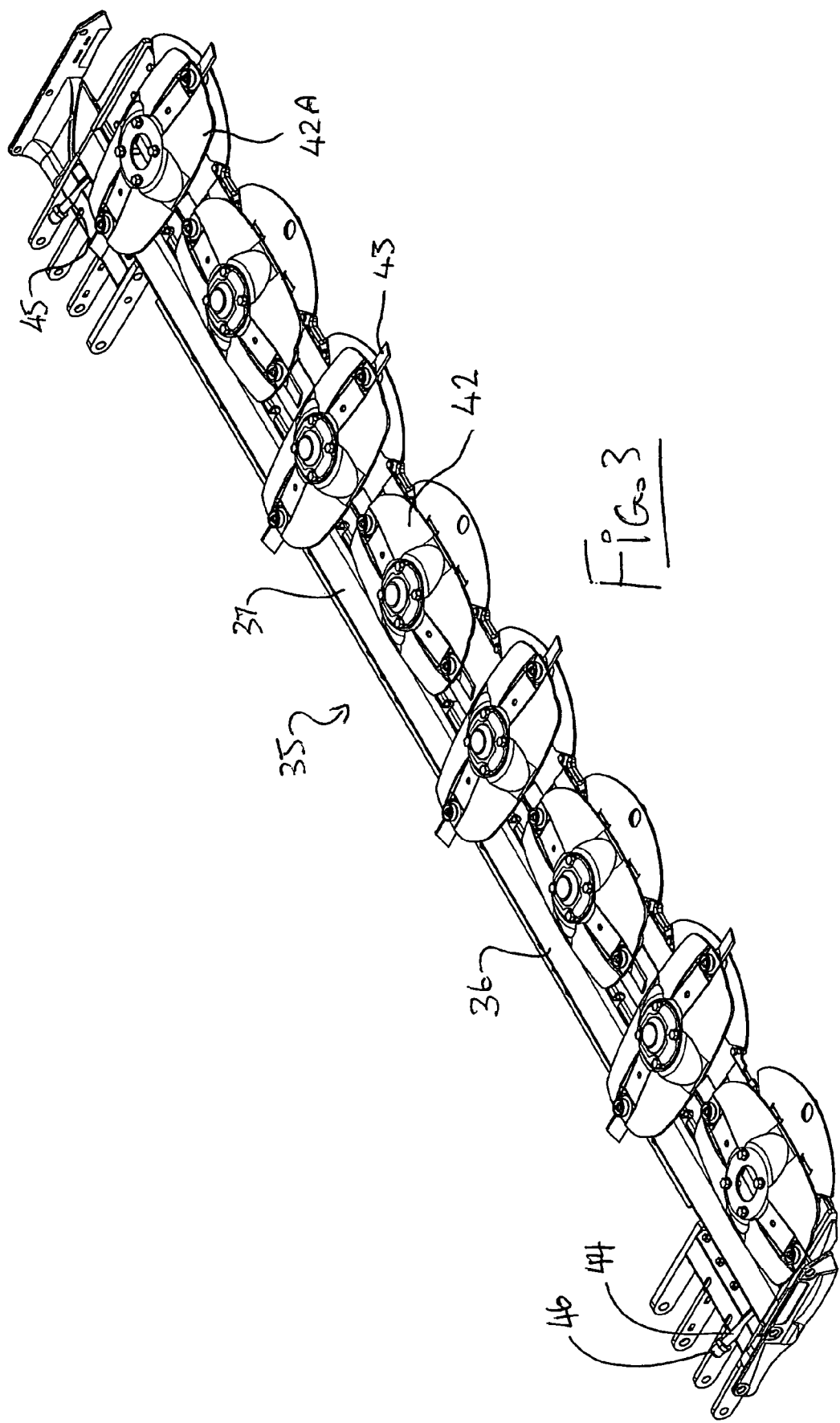
FIG. 3 is an isometric view of the cutter bar assembly of FIG. 2.
Figure 4:
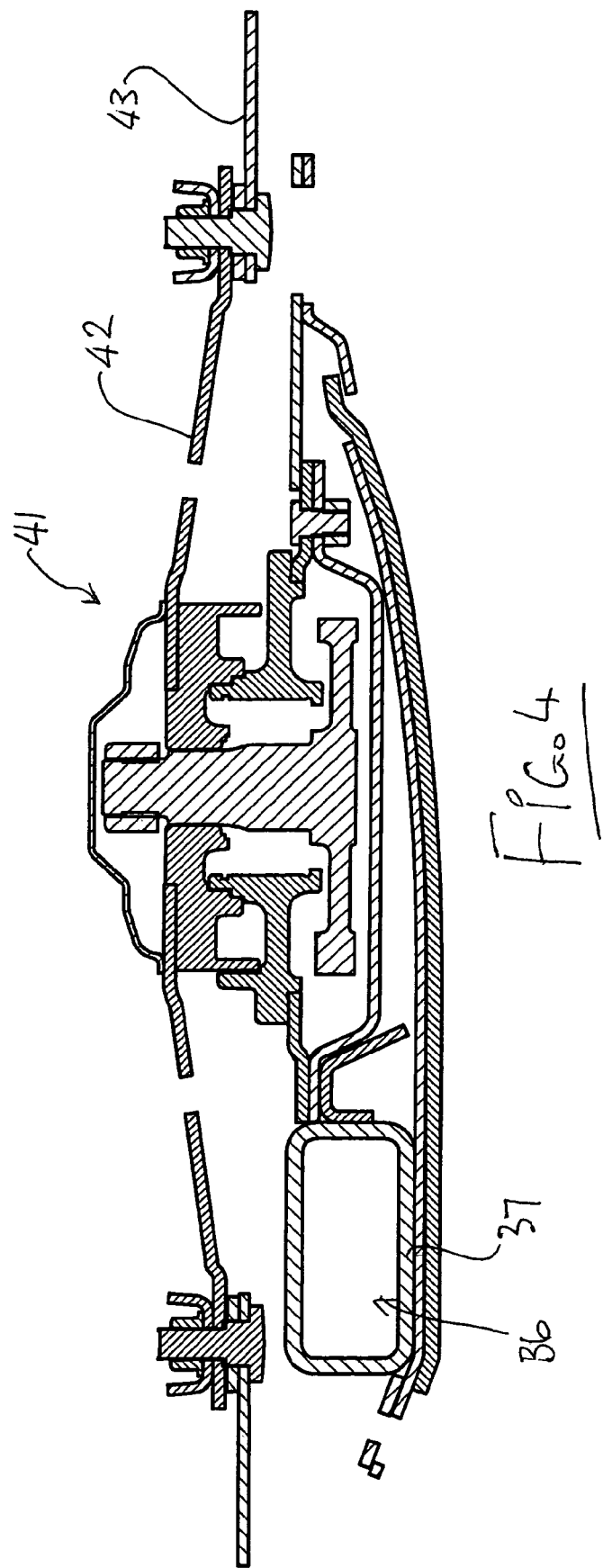
FIG. 4 is a cross sectional view through the cutter bar assembly of FIG. 2.

In FIG. 1 is shown a pull type harvesting machine generally indicated at 10 for attachment to a tractor (not shown) by a hitch coupling generally indicated at 11. The crop harvesting machine shown is of the type which uses a row of discs mounted on a cutter bar as shown in FIG. 2. Thus each disc is mounted on the cutter bar for rotation about its own axis with the axes spaced positions across the width of the cutter bar and when the axes generally vertical. Each disc carry blades at 180° spacing so that one disc rotate 90° out of phase with the next adjacent disc thus allowing the cutting action of the blades to overlap. Arrangements of this type are well known and many examples can be found in the prior art. The cutter bar of FIG. 2 is mounted on a frame generally indicated at 12 and is covered by a housing generally indicated at 13 so that the cutter system is enclosed for safety.

The frame 12 includes a transverse beam 14 which extends across the width of the harvesting device to a pair of legs 15 and 16 which depend downwardly from the transverse beam 14 to support a pair of wheels 17 and 18 which carry the frame in movement across the ground.

A hitch arm 19 is attached to the transverse beam 14 by a mounting bracket 20. In the embodiment shown the bracket 20 is located at the center of the beam 14 so that the hitch arm 19 can pivot to one side or the other side under control of a cylinder 21. It will be appreciated that movement of the hitch arm to one side acts to tow the harvesting machine in echelon to one side of the tractor and pivotal movement of the hitch arm to the other side tows the harvesting machine in echelon to the opposite side. The hitch arm can also be located centrally in which case the harvesting machine is towed behind the tractor generally in a transport position. The height of the cutter bar from the ground is adjusted by a cylinder 22 which lifts the cutter bar and its supports relative to the transverse beam 14.

The hitch arm 19 is attached to the tractor by a hitch coupling 23. The hitch coupling 23 includes a connector bracket 24 which attaches to the tractor hitch and includes a mechanical drive linkage 25 which communicates power from the PTO of the tractor to a pump 26.

The pump 26 generates a flow of hydraulic fluid under pressure which is transmitted through a hydraulic line 27 to a motor 28 at the cutter bar. The motor 28 is located above one end cutter of the cutter bar and drives the cutter bar through a gear box (not shown) which provides power to the end cutter of the cutter bar and at the same time also provides a power output for driving a conditioner (not shown).

Fluid returning from the motor 28 passes along a return line 29 to a filter 30 and from the filter 30 enters a sump tank 31 defined by the hollow interior of the hitch arm 19. The hitch arm is thus closed at its rear end 32 by a closure wall and is also closed at its forward end 33 by a further closure wall so that it forms a container for the returning hydraulic fluid.

The cutter bar is shown in more detail in FIG. 2 generally indicated at 35 and includes a support frame 36 which is defined by a transverse tubular structural member 37 which extends from one end 38 to an opposed end 39. The tubular structural member 37 is closed at each end and thus forms a hollow interior. The structural member is formed from a steel tube of rectangular cross section and is attached at its ends to support members 40 which are connected to the frame 12 of the harvesting machine. The tubular member 37 provides a structural support for the main elements of the cutter bar 41 which carry the drive elements for the cutter discs generally indicated at 42. In the embodiment shown there are eight cutter discs but it will of course be appreciated that the number of discs can be increased or decreased as required. The discs are generally oval in shape with each carrying a pair of cutter blades 43 at diametrically opposed positions at the long axis of the disc. The cutter bar provides drive for the discs so that each is rotated about its own vertical axis with the axes spaced along the length of the cutter bar 41. The discs are turned so that they are 90° out of phase with the next adjacent disc so that the blades pass in an overlapping manner to provide a cutting action in front of the cutter bar as the cutter bar is moved forwardly over the ground.

The hollow interior of the tubular member 37 includes a first outlet port 44 at one end and a second outlet port 45 at the other end. These ports are simple pipes welded to one side face of the tubular member and in the embodiment shown these pipes project rearwardly from the vertical rear face of the tubular member and include a coupling 46 on the outer end for attachment to a hydraulic hose.

Also shown in FIG. 2 is the motor 28 which provides an output drive shaft 28A driving the end most disc 42A. This provides power to the cutter bar 41 which is transmitted through gear elements within the cutter bar (not shown) to each of the discs. Fluid from the hydraulic line 27 shown in FIG. 1 is communicated, as shown in FIG. 2, to the motor 28 from the pump. This fluid acts to drive the motor 28 and communicate power to the cutter bar and to a conditioner system (not shown) which is optional.

Fluid from the motor 28 passes through a line 47 to the inlet coupling 46 of the pipe 44 so that the fluid from the motor enters the hollow interior of the tubular member 37 and flows through the tubular member 37 to the outlet pipe 45 and its coupling 46. The outlet pipe is attached to the return line 29 which communicates to the filter 30 and from the filter into the hollow interior of the hitch arm 19. In an alternative design only a portion of the oil is routed through the cutter-bar. A restriction is placed in the return line to force some oil into the auxiliary cooling system, and the oil that passes through the restriction goes directly to the filter.

Thus heat generated in the motor 28 is extracted from the hydraulic fluid passes through the tubular member 37.

The tubular member 37 is located at or close to the ground so that it is contact with stubble passing under the cutter bar after being cut by the discs 42. Thus remaining crop material sweeps over the underside of the tubular member 37 and acts to remove by conduction heat from the outside surface of the tubular member thus cooling the hydraulic fluid within the tubular member.

In addition, the tubular member is located in the high velocity air stream generated by the rotating discs. The air stream passes over the cutter bar 41 and the tubular member 37 in a stream with the crop that passes over the cutter bar so that the airstream also acts to remove heat from the tubular member, primarily by convection. Also crop material passing over the top of the tubular member contacts the tubular member and also acts to remove further heat.

Thus the tubular member 37 acts as an effective radiator or cooling member which extracts significant quantity of heat from the hydraulic fluid exiting from the motor 28 and passing through the hydraulic circuit.

The cooling member formed by tubular member 37 extends across the full width of the header and thus achieves a significant cooling effect due to its length.

A tubular member has a relatively small volume in view of the fact that the cross sectional area of the tubular member necessary at this location for structural strength is relatively small so that the total volume within the tubular member may be in the range 4 to 10 gallons which is relatively small in the total capacity of fluid within the harvesting machine. However the high cooling effect obtained by this tubular member allows the relatively small volume of fluid to be cooled to a degree sufficient to maintain the circuit at a required temperature without allowing excess temperatures to occur.

The cooling provided in the tubular element 37 can be supplemented by additional cooling provided by the fluid contained within the tank defined by the hitch arm 19. Alternatively the tubular element 37 can act itself as the return tank so that the line 29 can pass directly from the filter 30 back to the pump. However this arrangement is not preferred since the volume provided by the tubular element 37 is insufficient to provide the return sump and in addition it is insufficiently close to the pump to ensure a proper supply of fluid to the return side of the pump.

As shown in FIG. 1, the tubular frame member 14 can also act as a cooling element for the hydraulic fluid. This may be in addition to the tubular element 37 or may be in replacement for the tubular element 37. It may also be in replacement for the container defined by the hitch arm 19. In the embodiment shown in FIG. 1 the hose 29 may be coupled to an inlet tube 29A of the tubular frame member 14 with a return line (not shown) being connected to an outlet 29B. These connections to the hollow interior of the tubular member are provided adjacent the ends of the tubular member and communicate with the hollow interior to allow the fluid to pass through the tubular member. The ends of the tubular member are closed by welded end plates which attach across the ends of the tubular member 14.

In this way suitable cooling for the crop harvesting machine can be selected using one or more of the hitch-arm 19, the tubular member 14 and the tubular member 37 as cooling members for the hydraulic fluid and/or for the return sump for the hydraulic fluid.

Some disc mowers have a side delivery unit mounted to the rear of the mower which is typically hydraulically driven. On occasion, hydraulic oil coolers are used to cool the oil, even though power requirement is low. In another arrangement, it is possible to use cooling system disclosed herein to cool the oil for driving this or another auxiliary function on the mower such as well as or independently of the cooling of the oil in the main drive system as described above.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A pull-type crop harvesting machine for towed movement by a tractor comprising:
a frame mounted on ground wheels for movement across ground carrying a standing crop for harvesting;
a cutter system mounted across a front of the frame so that the frame carries the cutter system into the standing crop for cutting the standing crop and converging the cut crop into a crop discharge;
a hitch arm extending from the frame to a forward end of the hitch arm arranged for attachment to a hitch connector of a tractor by which the frame and the cutter system are towed across the ground;
a connecting assembly for connecting the forward end of the hitch arm to a hitch connector of the tractor;
a hydraulic circuit for providing drive to the machine comprising:
a hydraulic pump for generating a flow of hydraulic fluid under pressure;
a hydraulic motor for driving the cutter system;
hydraulic connection lines for communicating the flow from the pump to the motor and from the motor back to the pump;
and a mechanical drive connection for connecting the pump to a PTO shaft of the tractor;
the frame including a transverse frame member extending across the frame at the rear of the hitch arm;
the transverse frame member having ground wheels attached thereto for supporting the frame in movement across the ground;
the frame including a transverse cutter support bar extending across the frame at the cutting system for supporting the cutting system;
at least one of the transverse frame member and the transverse cutter support bar being formed from a tubular structural member which is closed at or adjacent each end so as to form a hollow conduit and having a fluid connection at each end for connection to the hydraulic connection lines such that hydraulic fluid in the hydraulic circuit passes through said at least one of the transverse frame member and the transverse cutter support bar so as to effect cooling of the hydraulic fluid.

2. The machine according to claim 1 wherein there is provided a sump tank and a filter in the hydraulic circuit.

3. The machine according to claim 2 wherein the sump tank is defined by the hitch arm which is formed from a tubular structural member which is closed at or adjacent each end so as to form a hollow conduit and having a fluid connection at each end for connection to the hydraulic connection lines such that hydraulic fluid in the hydraulic circuit passes through the hitch arm so as to effect cooling of the hydraulic fluid.

4. The machine according to claim 1 wherein the hydraulic drive is arranged to drive the cutter system.

5. A pull-type crop harvesting machine for towed movement by a tractor comprising:
a frame mounted on ground wheels for movement across ground carrying a standing crop for harvesting;
a cutter system mounted across a front of the frame so that the frame carries the cutter system into the standing crop for cutting the standing crop and converging the cut crop into a crop discharge;
a hitch arm extending from the frame to a forward end of the hitch arm arranged for attachment to a hitch connector of a tractor by which the frame and the cutter system are towed across the ground;
a connecting assembly for connecting the forward end of the hitch arm to a hitch connector of the tractor;
a hydraulic circuit for providing drive to the machine comprising:
a hydraulic pump for generating a flow of hydraulic fluid under pressure;
a hydraulic motor for driving the cutter system;
hydraulic connection lines for communicating the flow from the pump to the motor and from the motor back to the pump;
and a mechanical drive connection for connecting the pump to a PTO shaft of the tractor;
the frame including a transverse frame member extending across the frame at the rear of the hitch arm;
the transverse frame member having ground wheels attached thereto for supporting the frame in movement across the ground;
the frame including a transverse cutter support bar extending across the frame at the cutting system for supporting the cutting system;
the transverse cutter support bar being formed from a tubular structural member which is closed at or adjacent each end so as to form a hollow conduit and having a fluid connection at each end for connection to the hydraulic connection lines such that hydraulic fluid in the hydraulic circuit passes through said transverse cutter support bar so as to effect cooling of the hydraulic fluid.

6. The machine according to claim 5 wherein there is provided a sump tank and a filter in the hydraulic circuit.

7. The machine according to claim 6 wherein the sump tank is defined by the hitch arm which is formed from a tubular structural member which is closed at or adjacent each end so as to form a hollow conduit and having a fluid connection at each end for connection to the hydraulic connection lines such that hydraulic fluid in the hydraulic circuit passes through said transverse cutter support bar so as to effect cooling of the hydraulic fluid.

8. The machine according to claim 5 wherein the hydraulic drive is arranged to drive the cutter system.

9. The machine according to claim 5 wherein the transverse cutter support bar is cooled by contact with an air stream generated by the cutter system.

10. The machine according to claim 5 wherein the transverse cutter support bar is cooled by contact with crop as the bar passes over the ground.

11. The machine according to claim 5 wherein the transverse cutter support bar contains less than 5 gallons of the hydraulic fluid.

12. The machine according to claim 5 wherein the cutter system comprises an elongate drive member and a plurality of rotating disks mounted on the drive member at spaced positions across the width of the header.

13. The machine according to claim 12 wherein the transverse cutter support bar is located behind the rotating disks.

* * * * *